United States Patent
Elshenawy

(10) Patent No.: US 12,135,217 B2
(45) Date of Patent: Nov. 5, 2024

(54) SYSTEMS AND METHODS FOR MULTI-MODALITY AUTONOMOUS VEHICLE TRANSPORT

(71) Applicant: GM Cruise Holdings LLC, San Francisco, CA (US)

(72) Inventor: Mohamed M. Elshenawy, Burlingame, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 243 days.

(21) Appl. No.: 17/966,863

(22) Filed: Oct. 16, 2022

(65) Prior Publication Data

US 2023/0032496 A1 Feb. 2, 2023

Related U.S. Application Data

(63) Continuation of application No. 16/288,567, filed on Feb. 28, 2019, now Pat. No. 11,512,967, which is a (Continued)

(51) Int. Cl.
*G01C 21/34* (2006.01)
*G05D 1/00* (2006.01)
(Continued)

(52) U.S. Cl.
CPC ....... *G01C 21/3423* (2013.01); *G01C 21/343* (2013.01); *G05D 1/0088* (2013.01); *G05D 1/0274* (2013.01); *G08G 1/096805* (2013.01); *G08G 1/202* (2013.01); *G05D 1/0212* (2013.01); *G05D 1/0257* (2013.01); *G05D 1/027* (2013.01); *G05D 1/0278* (2013.01); *G08G 1/096866* (2013.01)

(58) Field of Classification Search
CPC .............. G01C 21/3423; G01C 21/343; G05D 1/0088; G05D 1/0274; G05D 1/0212; G05D 1/0257; G05D 1/027; G05D 1/0278; G08G 1/096805; G08G 1/202; G08G 1/096866
See application file for complete search history.

(56) References Cited

U.S. PATENT DOCUMENTS 7,469,859 B1   12/2008  Campbell
10,156,848 B1*  12/2018  Konrardy ............... G06Q 40/08
(Continued)

FOREIGN PATENT DOCUMENTS

CN   108629442 A   10/2018
CN   113874682 A   12/2021
WO   2020176155 A1   9/2020

OTHER PUBLICATIONS

"Communication Pursuant to Article 94(3) EPC for European Patent Application No. 19824150.7", Mailed Date: Feb. 20, 2023, 4 pages.
(Continued)

*Primary Examiner* — Behrang Badii

(57) ABSTRACT

Technologies disclosed herein facilitate identification of a trip route from an origin of a user to a desired destination of the user, wherein the trip route includes multiple transportation modalities, at least one of which is an autonomous vehicle (AV), and dispatching of the AV to a pickup location for the user in connection with providing transportation to the user along a portion of the identified trip route.

16 Claims, 11 Drawing Sheets

Related U.S. Application Data continuation of application No. 16/288,064, filed on Feb. 27, 2019, now Pat. No. 11,441,912.

(51) Int. Cl.
*G08G 1/00* (2006.01)
*G08G 1/0968* (2006.01)

(56) References Cited

U.S. PATENT DOCUMENTS

| | | | | |
|---|---|---|---|---|
| 10,248,120 | B1* | 4/2019 | Siegel | G05D 1/0223 |
| 10,303,171 | B1* | 5/2019 | Brady | G05D 1/0088 |
| 11,441,912 | B2 | 9/2022 | Elshenawy | |
| 11,512,967 | B2 | 11/2022 | Elshenawy | |
| 12,013,707 | B2* | 6/2024 | Williams | G08G 1/202 |
| 2010/0152998 | A1 | 6/2010 | Schwarzmann | |
| 2015/0006072 | A1 | 1/2015 | Goldberg et al. | |
| 2016/0364678 | A1 | 12/2016 | Cao | |
| 2017/0090480 | A1 | 3/2017 | Ho et al. | |
| 2017/0213273 | A1 | 7/2017 | Dietrich et al. | |
| 2018/0267536 | A1* | 9/2018 | Goldberg | G05D 1/0212 |
| 2018/0275661 | A1 | 9/2018 | Glaser | |
| 2019/0137290 | A1* | 5/2019 | Levy | B60Q 1/507 |
| 2020/0020232 | A1* | 1/2020 | Luomi | H04W 4/025 |
| 2020/0042019 | A1* | 2/2020 | Marczuk | G08G 1/202 |
| 2020/0124426 | A1 | 4/2020 | Beaurepaire et al. | |
| 2020/0241564 | A1* | 7/2020 | Goldman | G05D 1/0297 |
| 2020/0271466 | A1 | 8/2020 | Elshenawy | |
| 2020/0272954 | A1 | 8/2020 | Serra et al. | |
| 2020/0273333 | A1 | 8/2020 | Elshenawy | |
| 2021/0114616 | A1* | 4/2021 | Altman | H04W 76/15 |

OTHER PUBLICATIONS

"Response to Office Action for European Patent Application No. 19824150.7", Filed Date: Jun. 29, 2023, 66 pages.

"Communication Pursuant to Rules 161(1) and 162 EPC for European Patent Application No. 19824150.7", Mailed Date: Oct. 22, 2021, 3 pages.

"Corrected Notice of Allowance and Fees Due for U.S. Appl. No. 16/288,064", Mailed Date: Aug. 12, 2022, 2 pages.

"Corrected Notice of Allowance and Fees Due for U.S. Appl. No. 16/288,567", Mailed Date: Jul. 29, 2022, 2 pages.

"Corrected Notice of Allowance and Fees Due for U.S. Appl. No. 16/288,567", Mailed Date: Sep. 29, 2022, 2 pages.

"Final Office Action for U.S. Appl. No. 16/288,064", Mailed Date: Jul. 30, 2021, 29 pages.

"International Preliminary Report on Patentability for PCT Patent Application No. PCT/US2019/063897", Mailed Date: Aug. 25, 2021, 12 Pages.

"International Search Report for PCT Patent Application No. PCT/US2019/063897", Mailed Date: Mar. 13, 2020, 4 Pages.

"Notice of Allowance and Fees Due for U.S. Appl. No. 16/288,064", Mailed Date: Apr. 13, 2022, 9 pages.

"Notice of Allowance and Fees Due for U.S. Appl. No. 16/288,567", Mailed Date: Jun. 24, 2022, 14 pages.

"Non-Final Office Action for U.S. Appl. No. 16/288,567", Mailed Date: Aug. 5, 2021, 19 pages.

"Office Action for U.S. Appl. No. 16/288,064", Mailed Date: Jan. 22, 2021, 15 pages.

"Office Action for U.S. Appl. No. 16/288,567", Mailed Date: Jan. 5, 2022, 40 pages.

"Reply to Non-Final Office Action for U.S. Appl. No. 16/288,567", filed Nov. 5, 2021, 11 pages.

"Reply to Restriction Requirement for U.S. Appl. No. 16/288,567", filed Jul. 22, 2021, 2 Pages.

"Request for Substantive Examination for Chinese Patent Application No. 201980095833.1", Filed Date: Feb. 25, 2022, 32 pages.

"Request for PPH Examination for Chinese Patent Application No. 201980095833.1", Filed Date: Jun. 17, 2022, 33 pages.

"Response to Office Action for European Patent Application No. 19824150.7", Filed Date: Apr. 28, 2022, 4 pages.

"Response to the Final Office Action for U.S. Appl. No. 16/288,064", filed Nov. 30, 2021, 10 pages.

"Response to the Office Action for U.S. Appl. No. 16/288,064", filed Apr. 22, 2021, 12 pages.

"Response to Non-Final Office Action for U.S. Appl. No. 16/288,567", filed May 5, 2022, 13 pages.

"Restriction Requirement for U.S. Appl. No. 16/288,567", Mailed Date: May 24, 2021, 8 Pages.

"Written Opinion of the International Searching Authority for PCT Patent Application No. PCT/US2019/063897", Mailed Date: Mar. 13, 2020, 11 Pages.

First Office Action for CN Patent Application No. 201980095833.1; Mar. 26, 2024, 21 pages.

* cited by examiner

SYSTEMS AND METHODS FOR MULTI-MODALITY AUTONOMOUS VEHICLE TRANSPORT

RELATED APPLICATION

This application is a continuation of U.S. patent application Ser. No. 16/288,567, filed on Feb. 28, 2019, and entitled "SYSTEMS AND METHODS FOR MULTI-MODALITY AUTONOMOUS VEHICLE TRANSPORT", which is a continuation of U.S. Pat. No. 11,441,912, filed on Feb. 27, 2019, and entitled "SYSTEMS AND METHODS FOR MULTI-MODALITY AUTONOMOUS VEHICLE TRANSPORT", the entireties of which are incorporated herein by reference.

BACKGROUND

An autonomous vehicle (AV) is a motorized vehicle that can operate without a human driver. An exemplary AV includes a plurality of sensor systems, such as, but not limited to, a lidar sensor system, a camera sensor system, and a radar sensor system, amongst others. The AV operates based upon sensor signals output by the sensor systems. In an example, an AV includes a computing system that receives sensor signals from the sensor systems and that controls operation of propulsion, braking, and steering systems of the AV to navigate roadways while obeying traffic laws and avoiding obstacles.

An AV can be included in a fleet of AVs that are at least partially coordinated by a centralized server to provide AV transportation to users in an operational region. By way of example, the AV can be included in a rideshare transportation system whereby a user places an order for transportation from an origin to a destination by way of an Internet-connected mobile computing device, and a server in communication with the mobile computing device and the AV dispatches the AV to convey the user from the origin to the destination.

Conventionally, rideshare services provide conveyance all the way from a pickup location at which a user boards a vehicle to a destination of the user. For many trips, however, a single modality of transport may not be the fastest or least expensive way for the user to get from the user's origin to her destination. By way of example, during times of high traffic volume the fastest way for a user to get from his place of employment to his home may be to take a train for at least part of his journey. In a conventional transportation system, however, a user would have to estimate or guess whether using multiple modalities of transportation would be faster or cheaper in connection with reaching his destination. Furthermore, the user would have to manually order or otherwise make arrangements for each of the modalities individually which can potentially eliminate any time or cost savings associated with taking multiple-modality transport.

SUMMARY

The following is a brief summary of subject matter that is described in greater detail herein. This summary is not intended to be limiting as to the scope of the claims.

Various technologies that facilitate providing multiple-modality transportation to a user are described herein. With more particularity, technologies disclosed herein facilitate identification of an optimal trip route from an origin of a user to a desired destination of the user, wherein the optimal trip route includes multiple transportation modalities, at least one of which is an AV, and dispatching of the AV to a pickup location for the user in connection with providing transportation to the user along a portion of the identified trip route.

In an exemplary embodiment, a multiple-modality transportation system includes a client computing device, a server computing device, and an AV, wherein the server computing device is in communication with the client computing device and the AV. A user of the client computing device can interact with the client computing device to order transportation from a present location of the user (or other trip origin desired by the user) to a trip destination.

In example operations of the multiple-modality transportation system, the user provides input to the client computing device that indicates a desired trip destination of the user. Responsive to receipt of the user input, the client computing device outputs a trip request that is indicative of the desired trip destination to the server computing device. The server computing device generates a route plan for the trip request by performing an optimization over routing information pertaining to a region that includes the trip origin and the trip destination. For example, the server computing device can execute an optimization algorithm that identifies a fastest route from the trip origin to the trip destination taking into consideration multiple transportation modalities. Stated differently, the server computing device executes an optimization algorithm that determines the fastest way to travel from the trip origin to the trip destination using different transportation modalities to traverse different partial segments of the total trip route. The different transportation modalities considered by the optimization algorithm include transport by way of an AV. The different transportation modalities considered by the optimization algorithm can further include public transportation such as trains, buses, streetcars, etc. In other examples, the different transportation modalities can include walking, cycling, travel by way of scooter (e.g., using a scooter-share service), or substantially any other mode of transportation.

The server computing device transmits data indicative of the route plan to the client computing device, whereupon the client computing device displays graphical indicia of the route plan to the user. The user can provide further input to the client computing device indicating that the user desires to order transportation according to the route plan indicated in the data received from the server computing device. Responsive to receiving such user input the client computing device outputs a trip confirmation to the server computing device. The server computing device can then issue a pickup instruction to an AV in communication with the server computing device to cause the AV to navigate to a pickup location included in the route plan. Upon rendezvous with the user at the pickup location, the AV can convey the user from the pickup location to a drop off location in accordance with the route plan.

In some exemplary embodiments, the multiple-modality transportation system can include or be in communication with a transportation information server to facilitate provision of single-interaction ordering of multiple-modality transportation by way of the client computing device. By way of example, the server computing device can be in communication with a transportation information server that accepts orders of transportation fares for one or more public transportation modalities. Responsive to receipt of a trip confirmation from the client computing device, the server computing device can communicate with the transportation information server to process payment for a public transportation fare. Responsive to receipt of a proof of payment for the public transportation fare from the transportation information server, such as an electronic fare card, the server computing device can transmit the proof of payment to the client computing device. Subsequently, the user of the client computing device can use the proof of payment to gain admittance to public transportation (e.g., by displaying a graphical indication of the proof of payment on the client computing device to a bus operator). The multiple-modality transportation system can therefore enable a user to order and pay for access to multiple transportation modalities for conveyance along a trip route using a single user input.

In further embodiments of a multiple-modality transportation system, the system can be configured to dynamically update a route plan in real time to account for unforeseen changes in conditions affecting conveyance of a user from her trip origin to her trip destination. The client computing device can be configured to transmit updates pertaining to a location of the user to the server computing device in real time. The server computing device can then issue an updated pickup instruction to an AV based upon the updated location of the user to cause the AV to navigate to a pickup location other than a location indicated in the original route plan. In an illustrative example, the client computing device can be configured to transmit an update to a location of the user that indicates that the user has disembarked from a train at an earlier stop than a stop indicated in an original route plan generated by the server computing device. Responsive to receiving the update of the location of the user, the server computing device can issue a pickup instruction to an AV to cause the AV to navigate to the earlier stop in order to pick up the user. Thus, rather than requiring the user to board the train again and disembark at the stop indicated in the original route plan, the multiple-modality transportation system can coordinate AVs to adapt to movements of the user in connection with conveying the user to her destination.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
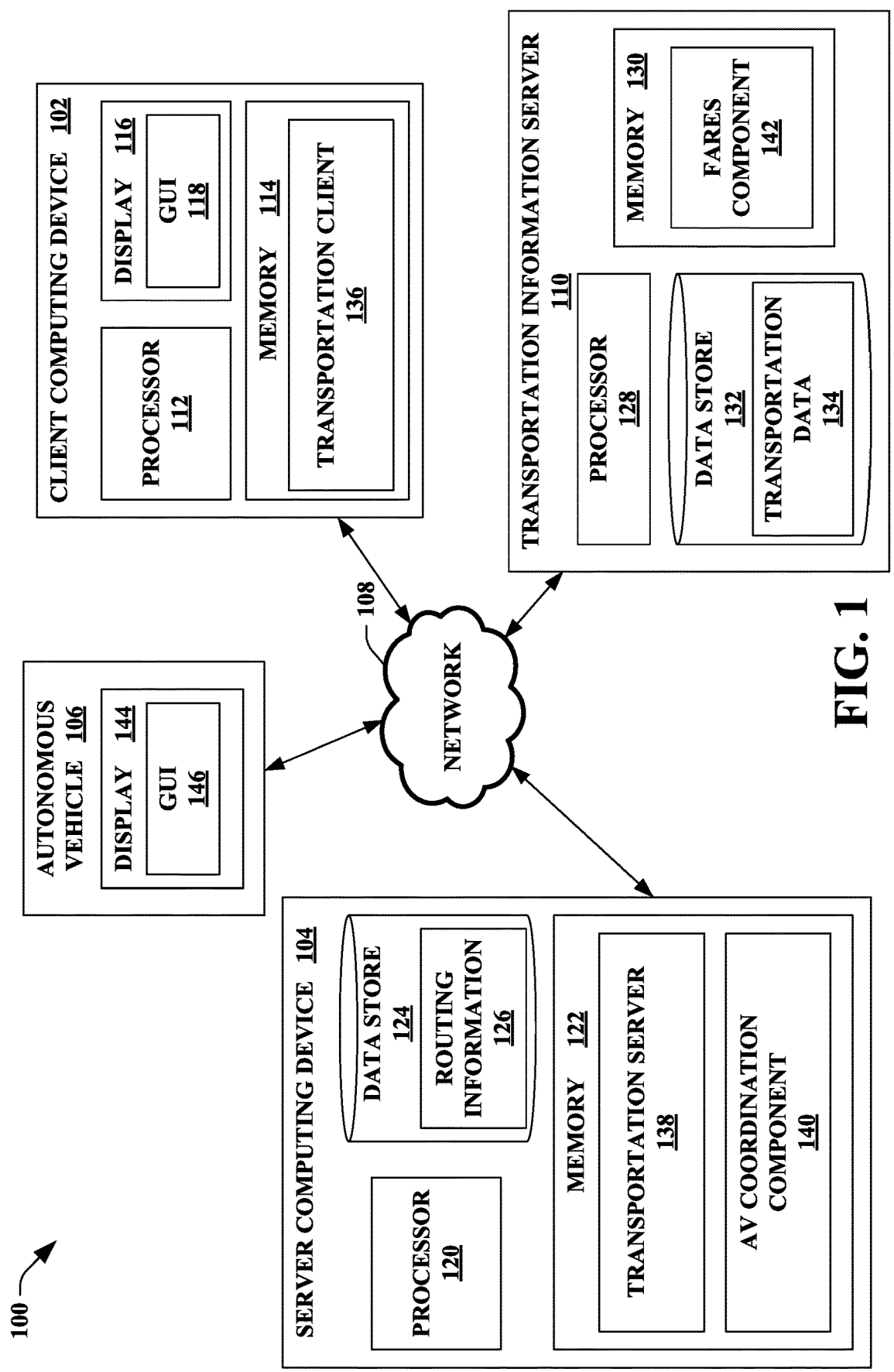
FIG. 1 illustrates a functional block diagram of an exemplary multiple-modality transportation system.

Various technologies pertaining to facilitating multiple-modality transportation are described herein. With more specificity, disclosed herein are technologies for identifying optimal multiple-modality trip routes and coordinating operation of autonomous vehicles (AVs) to facilitate providing multiple-modality transportation to users. Technologies set forth herein are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "client", "server", "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

With reference now to the drawings, FIG. 1 illustrates an exemplary multiple-modality transportation system 100 that facilitates presenting a multiple-modality transportation route from a point of origin to a destination to a user, and coordinating operation of one or more AVs to facilitate transportation of the user along the multiple-modality transportation route. Further, the multiple-modality transportation system 100 coordinates operation of one or more AVs in real-time responsive to updated locations of a user that are indicative of a potential change in the route plan of the user.

The exemplary multiple-modality transportation system 100 includes a client computing device 102, a server computing device 104, and at least one AV 106. The server computing device 104 is in communication with each of the client computing device 102 and the AV 106 by way of a network 108. The network 108 can include one or more intermediate network connections that facilitate communication among the elements of the system 100 connected to the network 108, and the network 108 can further be part of a larger network that includes the network 108. By way of example, and not limitation, the network 108 can include connections that facilitate communication between the server computing device 104 and the client computing device 102 and/or between the server computing device 104 the AV 106 by way of the Internet. In various embodiments the multiple-modality transportation system 100 can further include a transportation information server 110 that is in communication with at least the server computing device 104 by way of the network 108.

The multiple-modality transportation system 100 is configured to enable a user of the client computing device 102 to plan and order transportation along a multiple-modality transportation route within a single user interface (e.g., within a single application executing on the client computing device 102). In exemplary embodiments, a user of the client computing device 102 can view available multiple-modality transportation routes to a desired destination, and can order transportation along one of the multiple-modality transportation routes such that one or more AVs (e.g., the AV 106) is caused to convey the user along at least a portion of a multiple-modality transportation route.

Conventional rideshare services and other on-demand transportation services (such as bikeshare, scootershare, and the like) are generally limited to a single modality. By way of example, rideshare services that facilitate transportation of passengers by automobiles operated by human drivers conventionally only allow users to arrange for transport by a single automobile from a trip origin to a desired destination, albeit potentially making multiple stops to pick up additional passengers. Similarly, bikeshare and scootershare services generally only allow a user to rent a single bike or scooter for a period of time. To reach a destination using multiple transportation modalities using conventional transportation services, a user would have to manually determine whether using multiple modalities of transportation would be faster or cheaper in connection with reaching his destination. Furthermore, the user would have to manually order or otherwise make arrangements for each of the modalities individually. For example, conventionally a user could hire a first taxi to take him to the train station, pay for a train ticket to take the train some distance, and then hire a second taxi to take him the remaining distance to his origin.

In contrast with such conventional transportation systems, the multiple-modality transportation system 100 identifies a multiple-modality transportation route from an origin to a desired destination for a user, and can determine whether the multiple-modality route is faster, cheaper, or otherwise preferable to a single-modality route. Further, the multiple-modality transportation system 100 facilitates use of the multiple-modality transportation route by the user by coordinating one or more AVs to convey the user along portions of the route without requiring the user to place multiple transportation orders. In a non-limiting example, the multiple-modality transportation system 100 can cause the AV 106 to navigate to a terminus of a first portion of the route corresponding to a first modality, such that the AV 106 is waiting for the user when the user reaches the terminus. The AV 106 can then convey the user along a second portion of the route, the AV 106 being a second modality of transportation. A user can therefore order multiple-modality transportation wherein AVs and other transportation modalities are used in a combined manner to convey a user to her destination faster or cheaper than would be possible using single-mode transportation. Further, the system 100 can be configured such that if the user deviates from the original multiple-modality transportation route to arrive at an updated location (e.g., a location other than the terminus of the first portion of the route), the system 100 can cause an AV to meet the user at the updated location without requiring additional input from the user at the client computing device 102. The AV can then convey the user from the updated location at least partway to the destination of the user. For example, the AV can convey the user from the updated location to the destination of the user, or to an origin point for another modality of transportation, such as a train station. Conventional transportation systems generally require a user to cancel an existing transportation order and place a new transportation order if the user deviates from an existing transportation plan.

Various details of the multiple-modality transportation system 100 are now set forth. The client computing device 102 includes a processor 112 and memory 114 that is operably coupled to the processor 112 and that stores computer-executable instructions that are executed by the processor 112. The client computing device 102 further comprises a display 116 on which can be displayed a graphical user interface (GUI) 118. In exemplary embodiments, the client computing device 102 can be a mobile computing device such as a smartphone, a tablet computing device, a laptop personal computer, or the like. In other exemplary embodiments, the client computing device 102 can be a desktop computing device, a computing device included in a kiosk for providing transportation services, etc. Still further, while the client computing device 102 is depicted in FIG. 1 as a separate component of the system 100, it is to be understood that the client computing device 102 can be a computing device included on the AV 106.

The server computing device 104 also includes a processor 120 and memory 122 operably coupled to the processor 120, the memory 122 including computer-executable instructions that are executed by the processor 120. The server computing device 104 further includes a data store 124 that stores routing information 126 pertaining to an operational region of the multiple-modality transportation system 100.

The transportation information server 110 similarly includes a processor 128, memory 130 operably coupled to the processor 128, and a data store 132 that includes transportation data 134 relating to one or more transportation modalities operative in the operational region of the system 100. As described in greater detail below, the server computing device 104 can communicate with the transportation server 110 to receive real time updates pertaining to one or more transportation modalities operable in a region. The server computing device 104 can further communicate with the transportation server 110 to facilitate payment of a fare for a transportation service and to provide an authorization purchased with the fare to a user operating the client computing device 102.

Figure 2:
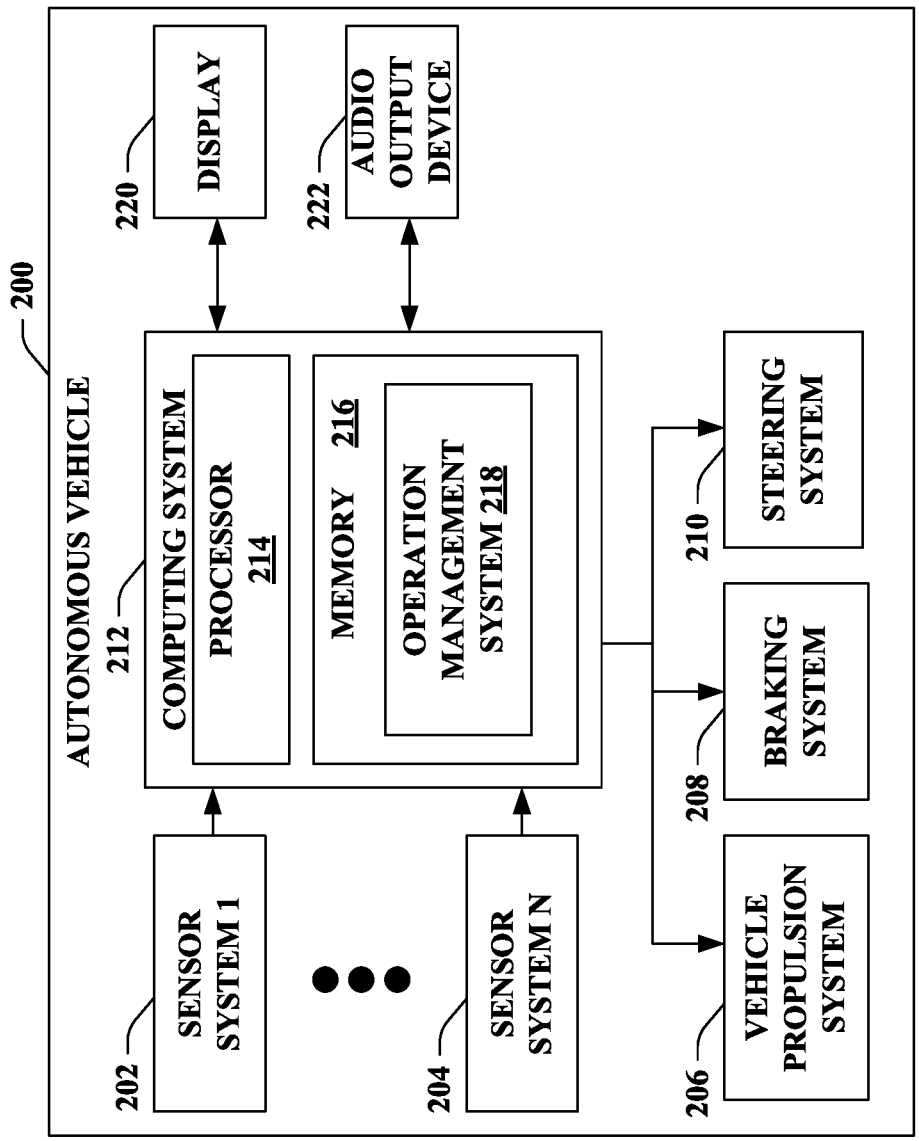
FIG. 2 illustrates a functional block diagram of an exemplary AV.

Referring now to FIG. 2, an exemplary AV 200 is illustrated. In exemplary embodiments, the AV 106 of the multiple-modality transportation system 100 can be the AV 200. The AV 200 can navigate about roadways without human conduction based upon sensor signals outputted by sensor systems of the AV 200. The AV 200 includes a plurality of sensor systems, namely, a sensor system 1 202, . . ., and a sensor system N 204, where N can be substantially any integer greater than 1 (collectively referred to herein as sensor systems 202-204). The sensor systems 202-204 are of different types and are arranged about the AV 200. For example, the sensor system 1 202 may be a lidar sensor system and the sensor system N 204 may be a camera sensor (image) system. Other exemplary sensor systems included in the sensor systems 202-204 can include radar sensor systems, GPS sensor systems, sonar sensor systems, infrared sensor systems, and the like.

The AV 200 further includes several mechanical systems that are used to effectuate appropriate motion of the AV 200. For instance, the mechanical systems can include, but are not limited to, a vehicle propulsion system 206, a braking system 208, and a steering system 210. The vehicle propulsion system 206 can be an electric motor, an internal combustion engine, or a combination thereof. The braking system 208 can include an engine brake, brake pads, actuators, and/or any other suitable componentry that is configured to assist in decelerating the AV 200. The steering system 210 includes suitable componentry that is configured to control the direction of movement of the AV 200.

The AV 200 additionally includes a computing system 212 that is in communication with the sensor systems 202-204, the vehicle propulsion system 206, the braking system 208, and the steering system 210. The computing system 212 includes a processor 214 and memory 216. The memory 216 includes computer-executable instructions that are executed by the processor 214. Pursuant to various examples, the processor 214 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 216 of the computing system 212 includes an operation management system 218 that is configured to receive sensor signals from the sensor systems 202-204 and to output data pertaining to objects detected in the driving environment of the AV 200. By way of example, the operation management system 218 can be configured to generate perception data indicative of a position, velocity, type, etc. for each of a plurality of objects in the driving environment of the AV 200 based upon the sensor signals. The operation management system 218 is further configured to control at least one of the mechanical systems of the AV 200 (e.g., at least one of the vehicle propulsion system 206, the braking system 208, and/or the steering system 210). By way of example, the operation management system 118 can be configured to output control signals to any of the vehicle propulsion system 206, the braking system 208, or the steering system 210 to cause such systems 206-210 to direct the AV 200 along a trajectory. The operation management system 218 can further be configured to determine a planned trajectory for the AV 200 based upon the perception data.

With reference once again to FIG. 1, exemplary operations of the system 100 are described in connection with providing multiple-modality transportation to a user of the client computing device 102. The client computing device 102 executes a transportation client application 136 that is configured to allow a user to order multiple-modality transportation. The transportation client 136 is configured to communicate with a transportation server application 138 executing on the server computing device 104. The transportation client application 136 presents data to the user of the client computing device 102 and receives input from the user by way of the GUI 118.

In an initial interaction with the client computing device 102 in connection with ordering transportation for a trip, the user provides input to the client computing device 102 that indicates a desired destination for the trip. By way of various examples, the user can type a name of a desired destination, the user can select a desired destination on a map displayed on the GUI 118 by the transportation client 136, or the user can select the desired destination from a list of potential destinations displayed on the GUI 118 by the transportation client 136. The user can further optionally input a desired origin for the trip by way of the GUI 118. In other exemplary embodiments, the transportation client 136 can receive location information indicating a present location of the client computing device 102 and uses the present location as the origin for the trip. By way of example, the transportation client 136 can receive the present location of the client computing device 102 from a sensor included on the client computing device 102 (e.g., a GPS sensor). In other examples, the client computing device 102 can determine the present location of the client computing device 102 based on IP address information, WiFi location information, or other data that is indicative of a location of the client computing device 102. Responsive to receiving the user input indicating the desired destination of the user, the transportation client 136 generates a trip request that comprises data indicative of the trip origin and the trip destination, and outputs the trip request to the server computing device 104 by way of the network 108.

The transportation client 136 can further be configured to generate the trip request based upon a user selection of a desired optimization parameter. For example, in connection with inputting the desired destination of the user, the user can further indicate whether the user wants to take a fastest route, a least expensive route, or a route having the shortest distance. In further embodiments, a user can adjust a relative preference among multiple optimization parameters. In a non-limiting example, the user can indicate a relative preference for time versus money. By way of further example, the user can indicate that a route that is a first threshold amount longer in duration is acceptable to the user provided that the route is at least a second threshold amount cheaper to take. The transportation client 136 can generate the trip request to include data indicating desired optimization parameters of the user and optionally a relative preference among multiple optimization parameters.

Figure 3:
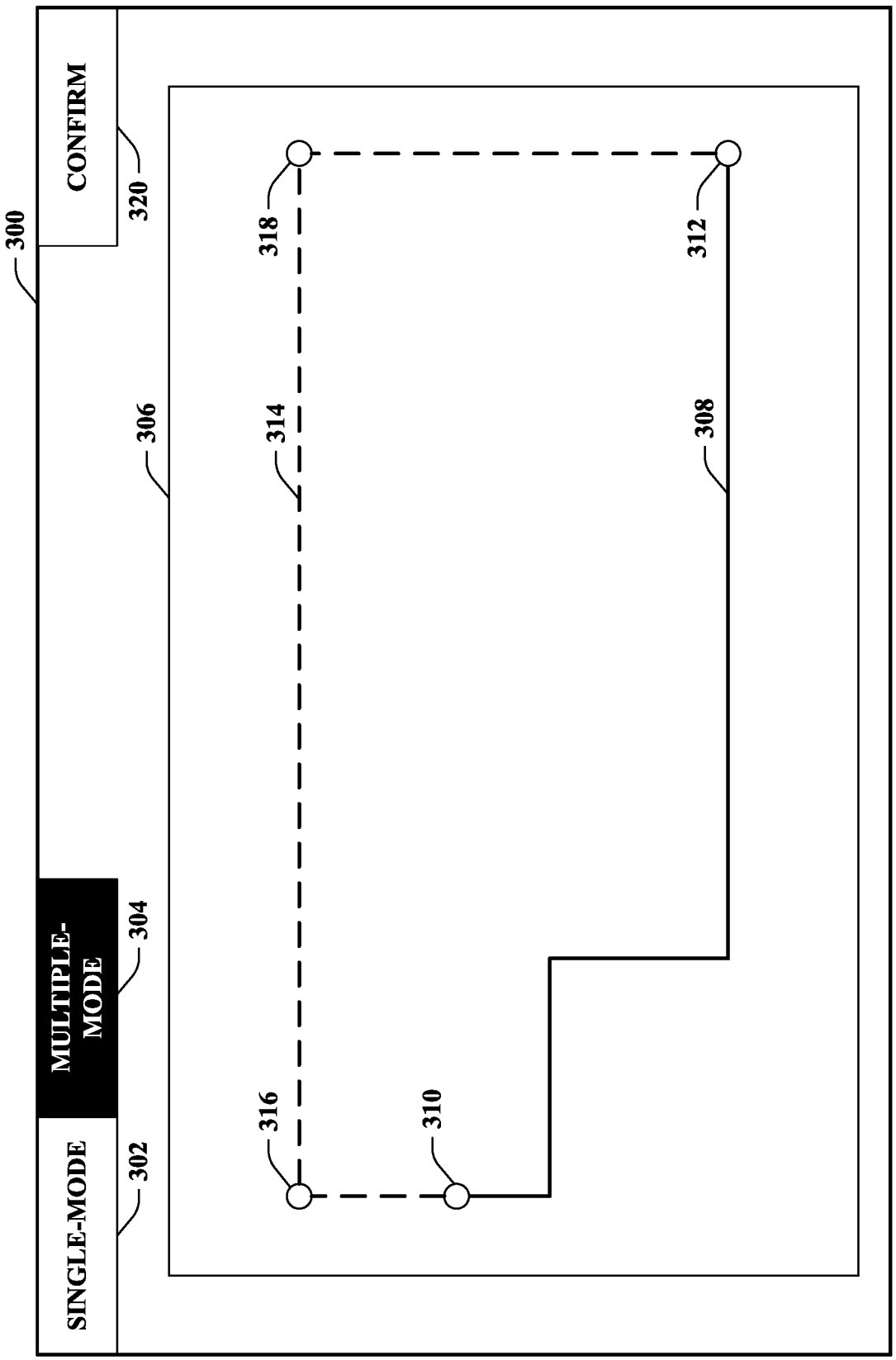
FIG. 3 illustrates an exemplary graphical user interface of a transportation client application.

The trip request generated by the transportation client 136 can also indicate that the request is for single-modality transportation or multiple-modality transportation. In some instances, a user may want to be able to select single-modality transportation if for some reason multiple-modality transportation is not preferable to the user. For example, if the user is traveling a long distance and wants uninterrupted time to work or take a phone call, the user may not want to transfer from one transportation modality to another. Accordingly, the transportation client 136 can include a modality setting that can be toggled by the user between single-modality transportation and multiple-modality transportation. The transportation client 136 can generate the trip request based upon the modality setting. In some embodiments, the transportation client 136 can allow the user to select single-mode or multiple-mode transportation at the time that the user is providing input for a trip request. Referring now briefly to FIG. 3, an exemplary GUI 300 for display on the display 116 of the client computing device 102 is shown. The GUI 300 includes selection regions 302, 304 corresponding to single-mode transportation and multiple-mode transportation, respectively. The transportation client 136 can generate the trip request based upon a user selection of single-mode or multiple-mode transportation by way of the selection regions 302, 304. In exemplary embodiments, a default mode of transportation for single-mode transportation can be conveyance by an AV.

In still further embodiments, the transportation client 136 can generate the trip request based upon user indications of particular modalities of transportation that the user is willing to take. For instance, the user can provide input to the transportation client 136 that indicates transportation modalities that the user is willing to take along a multiple-modality transportation route. Modalities indicated by such user input can be stored as a modality setting of the transportation client 136. In a non-limiting example, the modality setting can indicate that the user is willing to take AVs, trains and buses but that the user is not willing to walk or use a scooter for parts of a multiple-modality trip. In further embodiments, the modality setting can be region dependent such that the transportation client 136 stores different modality settings for different operational regions. By way of example, the modality setting of the transportation client 136 can indicate that the user is willing to use AVs, trains, buses, and scooters in San Francisco, whereas the modality setting can indicate that in Cleveland the user is only willing to use scooters and AVs for multiple-modality transportation. In still further embodiments, the modality setting can be time dependent. By way of example, the modality setting of the transportation client 136 can indicate that the user is willing to use a first set of modalities during a first set of times of day, and a second set of modalities during a second set of times of day. By way of further illustration, the modality setting of the transportation client 136 can indicate that the user does not want to walk or take bicycles after a certain time of night.

The transportation server application 138 receives the trip request from the transportation client 136 by way of the network 108. Responsive to receiving the trip request, the transportation server 138 generates a route plan for the trip request. The transportation server 138 generates the route plan by performing an optimization over the routing information 126. The transportation server 138 is configured to perform the optimization over the routing information 126 such that the transportation server 138 considers routes that include multiple transportation modalities. Stated differently, the transportation server 138 performs an optimization over the routing information 126 without constraining the route to occur along a single transportation modality. In exemplary embodiments, the transportation server 138 can be configured to perform the optimization over the routing information considering transportation modalities indicated in the trip request. In other embodiments, the transportation server 138 can be configured to perform the optimization over the routing information considering all available transportation modalities except those modalities specifically indicated in the trip request as being excluded.

The routing information 126 includes a map of a region that includes the trip origin and the trip destination indicated in the trip request. The routing information 126 can also include other data pertaining to various transportation modalities operating in the region or various conditions that can affect transportation through the region. By way of example, the routing information 126 can include routes and schedules for other modalities of transportation such as trains and buses, locations of personal transportation devices such as bicycles and scooters available on rideshare services, data indicating traffic conditions on streets in the region (e.g., updated in real time), and the like. The routing information 126 can further include locations of AVs in a fleet of AVs operating in the region. Still further, the routing information 126 can include real time updated weather and road conditions such as precipitation, outside temperature, road surface conditions (e.g., dry, wet, icy, etc.), and the like.

The server computing device 104 can be configured to periodically request updated information pertaining to transportation modalities operating in a region, and to further update the routing information 126 based upon such updated information. In an exemplary embodiment, the transportation server 138 can transmit a request to the transportation information server 110 for various data pertaining to a transportation modality operative in a region. The transportation information server 110 includes transportation data 134 that relates to one or more transportation modalities operative in the region. By way of example, the transportation information server 110 can be a computing device that is operated by a transportation service (e.g., a public transportation service or a privately operated transportation service such as a bikeshare service or a scooter-share service) and that provides information relating to transportation offered by the transportation service. Responsive to receiving the request from the transportation server 138, the transportation information server provides at least a portion of the transportation data 134 to the server computing device 104. In non-limiting examples, the transportation data 134 includes data pertaining to routes, schedules, available transportation resources (e.g., locations of shared personal transportation devices such as bicycles, scooters, and the like), current traffic conditions etc. for one or more transportation modalities. The server computing device 104 updates the routing information 126 to include the transportation data received from the transportation information server 110. By way of example, the server computing device 104 can update the routing information 126 in real time with data pertaining to a public transportation service such as schedules, service outages, transportation delays, locations of transportation resources of the public transportation service (e.g., trains, buses, streetcars, etc.). In other exemplary embodiments, the transportation server 138 can update the routing information 126 responsive to receiving new information relating to locations of AVs in a fleet of AVs.

In an exemplary embodiment, the transportation server 138 can be configured to perform the optimization to find each of a cheapest route, a fastest route, and a shortest route. In other embodiments, the transportation server 138 can be configured to perform the optimization to find one of the least expensive route, the fastest route, or the shortest route based upon a user selection indicated in the trip request received from the transportation client 136. In further embodiments, the transportation server 138 can be configured to perform the optimization to find various routes that satisfy desired optimization parameters and optionally a relative preference between desired optimization parameters, as indicated in the trip request received from the transportation client 136.

It is to be understood that the optimization can be performed subject to various additional constraints. For example, the optimization can be performed over the routing information 126 to find a least expensive route subject to an additional maximum time constraint for the trip. In another example, the optimization can be performed over the routing information 126 to find a fastest route subject to an additional constraint that defines a maximum number of modality transfers for the trip. In still another example, an additional constraint can be a location constraint that defines an operational region within which an entirety of the route plan should be situated. In another example, the location constraint can define an operational region in which no part of the route plan should enter. Such additional constraints can be defined by the user by way of input at the client computing device 102 and the constraints included in the trip request transmitted by the transportation client 136. In further embodiments, additional constraints on the optimization can be applied as default constraints by the transportation server 134. By way of example, the transportation server 134 can exclude certain transportation modalities such as walking, scooters, and bicycles in areas where the routing information 126 indicates that severe weather such as heavy rainfall is present.

As noted above, the transportation server 138 generates a route plan for a trip request received from the transportation client 136 by performing the optimization over the routing information 126. Depending on current travel conditions as indicated in the routing information 126, a route plan that includes multiple transportation modalities can be the route plan that best satisfies the various optimization constraints (e.g., that has a lowest cost according to a cost function used to perform the optimization).

Figure 4:
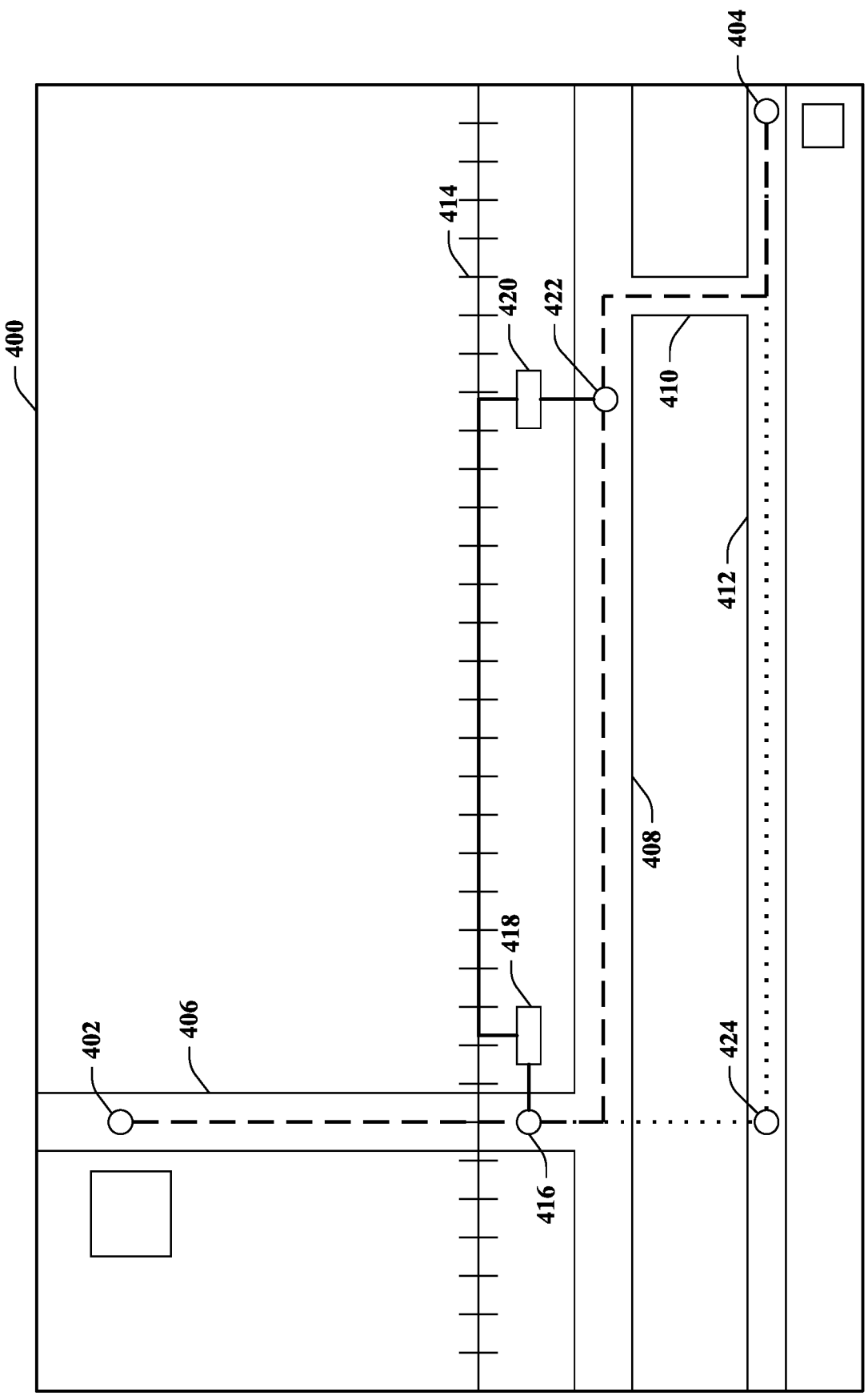
FIG. 4 is a conceptual diagram an exemplary operational region for a multiple-modality transportation system that includes various route plans.

By way of example, and referring now to FIG. 4, a conceptual diagram of various exemplary route plans is shown. FIG. 4 depicts a region 400 that includes a transportation origin 402 and a transportation destination 404. For example, the transportation origin 402 can be the place of work of a user, whereas the transportation destination 404 can be a home of a user. The region 400 includes a plurality of roadways 406-412 and a passenger railway 414. Three exemplary route plans are depicted in FIG. 4. Each of the three route plans begin at the origin 402 and include a first modality of transport from the origin 402 along the roadway 406 to a first terminus point 416. By way of example, the first modality of transport can be an AV that conveys the user from the origin to at least the first modality terminus point 416. At the first terminus point 416, the three route plans diverge. A first route plan that is a single-modality route plan continues on along the roadways 408, 410, and 412 all the way to the origin destination 404. Thus, for example, the first route plan is a route plan that conveys the user all the way from the origin 402 to the destination 404 in a single AV.

Whereas traveling along the first route plan may be the fastest way to reach the destination 404 from the origin 402 under some travel conditions, under other travel conditions it may be faster to travel along different routes. For example, during rush hour periods of high traffic, traversing the roadway 408 in an AV may be slower than taking a train that runs on the railway 414. Therefore, according to a second route plan, the user exits the first modality of transport at the first terminus point 416 and continues to a first train station 418 that lies along the railway 414. In the second route plan the user takes a second transport modality, the train, along the railway 414 to a second train station 420. According to the second route plan the user then takes a third transport modality, such as a bus or a second AV, from a second terminus point 422 to the destination 404. The second route plan therefore avoids potential traffic along roadway 408. In another example, the third route plan can direct a user to exit a first AV at the first terminus point 416 and to walk to a third terminus point 424 at the roadway 412 that runs parallel to the roadway 408. In such example, walking from the first terminus point 416 to the third terminus point 424 can be considered to be using a second transportation modality. The third route plan can then provide that the user is to take a second AV from the third terminus point 424 to the destination 404 along the roadway 412. The third route may be the fastest route when, for example, the roadway 408 is congested with traffic while another roadway, the roadway 412, allows more rapid movement of vehicles.

Upon generating the route plan, or multiple route plans (e.g., satisfying different optimization constraints), the transportation server 138 outputs data indicative of the route plan, or plans, to the transportation client 136. Responsive to receiving the data, the transportation client 136 can cause to be displayed on the display 116 at least a portion of a route plan indicated in the data. The user can then indicate confirmation of a route plan by providing confirmation input by way of the GUI 118. By way of example, and referring again to FIG. 3, the GUI 300 can include a region 306 that displays graphical indicia of one or more route plans. The graphical indicia can include a path taken by a route plan including indications of terminus points at which the route plan switches from one modality of transport to another modality of transport. For example, the region 306 shown in the GUI 300 depicts a single-mode route plan 308 that extends from an origin 310 to a destination 312. The region 306 also depicts a multiple-mode route plan 314 that extends from the origin 310 to a first terminus point 316, from the first terminus point 316 to a second terminus point 318, and from the second terminus point 318 to the origin 312.

Referring once again to FIG. 1, the transportation client 136 outputs a confirmation indication to the transportation server 138 responsive to receiving confirmation input from the user at the GUI 118. The confirmation indication indicates to the transportation server 138 that the user has confirmed the route plan. In exemplary embodiments wherein the transportation server 138 outputs multiple route plans to the transportation client 136 responsive to receiving a trip request, the confirmation indication can include both a selection of one of the multiple route plans and a confirmation of the route plan. By way of example, and referring again to FIG. 3, the GUI 300 can include a selection region 320 that functions as a confirmation button for receipt of confirmation input. Responsive to receipt of user input in the selection region 320 (e.g., by way of a mouse click, tapping of the selection region 320 on a touchscreen, or the like), a client computing device on which the GUI 300 is displayed outputs a confirmation indication to a transportation server. Prior to providing the confirmation input at the selection region 320, the user can select one of the routes 308, 314 by selecting graphical indicia corresponding to the routes 308, 314 in the GUI 300.

Referring yet again to FIG. 1, the server computing device 104 receives the confirmation indication from the client computing device 102. Responsive to receiving the confirmation indication, the server computing device 104 can issue a pickup instruction to the AV 106. In exemplary embodiments, the server computing device 104 includes an AV coordination component 140 that is configured to direct operation of the AV 106 and other AVs that may be operating in a fleet of AVs in an operational region that includes the trip origin and the trip destination. The AV coordination component 140 can issue a pickup instruction to the AV 106 to cause the AV 106 to navigate to a pickup location included in the route plan selected and confirmed by the user. The pickup instruction can be configured to cause the AV 106 to arrive at a location along the route prior to the user arriving at the location, so that the AV 106 can stand ready to continue conveying the user along the route when the user arrives. By way of example, and referring briefly to FIG. 4, the pickup instruction can cause an AV to navigate to the second terminus 422 in sufficient time that the AV will be waiting at the second terminus 422 when the user arrives at the second train station 420.

The server computing device 104 can further be configured to dynamically update a pickup location for an AV that is indicated in a route plan while the user is following the route plan. In an exemplary embodiment, subsequent to confirmation of the route plan with the user, the AV 106 can be traveling to a pickup location indicated in the route plan. The transportation client 136 can be configured to periodically output location data to the transportation server 138, the location data indicating an updated location of a user of the client computing device 102 as the user follows the route plan. The AV 106 can also be configured to periodically output location data that is indicative of an updated location of the AV 106 to the server computing device 104. Based upon the updated locations of the user and the AV 106, the transportation server 138 can update the route plan to indicate an updated pickup location that is different than the pickup location that was originally indicated in the route plan. By way of example, the transportation server 138 can output an indication of the updated pickup location to the transportation client 136, and the transportation client 136 can cause the updated pickup location to be presented to the user on the display 116. By way of further example, the AV coordination component 140 can issue an updated pickup instruction to the AV 106 that causes the AV 106 to navigate to the updated pickup location.

The transportation server 138 can update a pickup location according to any of various criteria. By way of example, and not limitation, as the user is following the route plan the transportation server 138 can perform an optimization over at least a portion of the routing information 126 based upon the updated location of the user and the updated location of the AV 106. The optimization can be configured to determine whether an updated pickup location would result in a faster travel time from the updated location of the user to the trip destination. In other embodiments, the transportation server 138 can update the pickup location based upon determining that either the user or the AV 106 will reach the original pickup location a threshold amount of time before the other. For example, the transportation server 138 can update the pickup location responsive to determining that one of the user or the AV 106 will reach the origin pickup location greater than one minute, greater than two minutes, or greater than five minutes before the other of the user or the AV 106. The transportation server 138 can update the pickup location such that the user and the AV 106 reach the updated pickup location within the threshold amount of time.

In further embodiments, the transportation server 138 can be configured to update the pickup location based upon determining that the user has deviated from the route plan. The transportation server 138 can determine that the user has deviated from the route plan based upon the updated location of the user. In an example, the transportation server 138 can determine that the user has deviated from the route plan based upon the updated location of the user being greater than a threshold distance away from any location along the route plan. In another example, the transportation server 138 can determine that the user has deviated from the route plan based upon an amount of time taken for the user to reach the updated location of the user. In still another example, the transportation server 138 can determine that the user has deviated from the route plan based upon a modality transition occurring at a location other than a terminus point indicated in the route plan. By way of further illustration, if the updated location of the user indicates that the user has exited the AV 106 prior to the AV 106 reaching its terminus point along the route plan, the transportation server 138 can determine that the user has deviated from the route plan. In another illustrative example, if the updated location of the user indicates that the user has disembarked from a train one or more stops earlier or later than indicated in the route plan, the transportation server 138 can determine that the user has deviated from the route plan.

In various embodiments, the transportation server 138 can be configured to process payment for transportation along at least a portion of the trip route responsive to receiving the confirmation indication. For instance, the transportation server 138 can process payment for portions of the trip route that are traversed by the AV 106. In an exemplary embodiment, the transportation server 138 can be configured to charge an account based upon stored account information associated with the user of the client computing device 102. In another example, the transportation server 138 can transmit a request for payment information to the client computing device 102. The user of the client computing device 102 can then input payment information (e.g., a credit card number) by way of the GUI 118, and the transportation client 136 can transmit the payment information to the server computing device 104.

The transportation server 138 can further be configured to communicate with the transportation information server 110 in order to pay for a fare of the user along one or more of the modalities included in the multiple-modality route plan and receive an authorization for use of a transportation resource, a transportation resource being a means of conveyance such as a train, an AV, a bus, a bicycle, a scooter, and so forth. In an exemplary embodiment, the transportation information server 110 includes a fares component 142 that is configured to process fare payments and to output an authorization for use of a transportation resource. By way of example, the fares component 142 can receive payment information and output an electronic ticket that is usable as proof of payment for admittance to a train or other public conveyance. The transportation server 138 can output a fare request that includes payment information to the transportation information server 110. The fares component 142 of the transportation information server 110 determines whether the payment information indicates a valid payment for a transportation resource indicated in the fare request (e.g., that the payment is sufficient for the transportation resource). Responsive to determining that the payment is valid, the fares component 142 outputs an indication of authorization for use of the transportation resource to the server computing device 104. The transportation server 138 can then provide the indication of authorization to the transportation client 136, whereupon the transportation client 136 can store the indication of authorization in the memory 114 for later use. By way of example, the authorization indication can include an electronic ticket that is usable for admittance to the transportation resource, and the transportation client 136 can subsequently display the electronic ticket on the display 116.

In various exemplary embodiments, the transportation client 136 and/or the AV 106 can be configured to assist the user of the multiple-modality transportation system 100 by providing guidance relating to a multiple-modality transportation route. In a non-limiting example, the AV 106 can be configured to display guidance to a user relating to the route plan. In exemplary embodiments, the AV 106 can include a display 144 that is positioned facing a passenger compartment of the AV 106. The display can display a GUI 146. The GUI 146 can indicate various information relating to the route plan including a location of the user along the route indicated in the route plan, a remaining time to reach the destination of the user, a remaining time until the route plan indicates that the user is to transfer to another modality of transport, or other desirable information. In another example, when the AV 106 reaches a terminus point at which the route plan indicates that the user is to switch to a different modality of transport, the AV 106 can display an indication on the display 144 that indicates information pertaining to the next modality of transport. By way of example, when the AV 106 reaches a terminus point where the route plan indicates that the user is to leave the AV 106 and board a train, the AV 106 can cause the display 144 to display an indication that the user should board the train. In further embodiments, the transportation client 136 can be similarly configured to display any of the data described above with respect to the display 144 on the display 116 of the client computing device 102.

In still other embodiments, responsive to the transportation server 138 determining that the user of the client computing device 102 has deviated from the route plan, the transportation server 138 can output a query to at least one of the client computing device 102 or the AV 106. Responsive to receipt of the query, the client computing device 102 can display a prompt on the display 116 (or the AV 106 can display the prompt on the display 144) to request user input indicating whether the user wishes to update the multiple-modality route plan to continue to the destination of the user, or if the user wishes to cancel the trip. The client computing device 102 can output an indication to the server computing device 104 that the trip is to be cancelled responsive to receipt of user input indicating cancellation. The client computing device 102 can output an indication to the server computing device 104 to update the multiple-modality route plan responsive to receipt of user input indicating that the user wishes to update the multiple-modality route plan. Similarly, the AV 106 can output such indications responsive to receipt of the user input (e.g., by way of the GUI 146).

It is to be understood that while an exemplary multiple-modality transportation system 100 has been described herein, various modifications to the exemplary system 100 are contemplated as being within the scope of the present disclosure. By way of example, the transportation information server 110 can be one of many server computing devices that correspond to different transportation modalities, or transportation modalities owned by different entities. In another example, multiple server computing devices can be configured to communicate with the server computing device 104 in connection with performing functionality described herein as being performed by the transportation information server 110. By way of example, a first server computing device can include the data store 132 that stores the transportation data 134 whereas a second server computing device can include the memory 130 that includes the fares component 142. Other potential modifications to the exemplary system 100 are also contemplated.

In view of the disclosure set forth above, it is to be appreciated that in various embodiments a multiple-modality transportation system includes a client device, a server, and one or more AVs, wherein the client device and the AVs are in communication with the server by way of a network. In an exemplary embodiment, functionality described as being performed by the server can be performed by a plurality of computing devices such as in a cloud computing system. In exemplary operations the client can send a trip request to the server, and the server can perform an optimization over routing information to determine potential route plans for the trip request, where one or more of the route plans can include multiple transportation modalities. The routing information can include real time traffic, weather, public alert, and transportation information pertaining to one or more modalities operating in a region. In an exemplary embodiment, the server can receive real time updates to the routing information from any of various sources such as weather, traffic, and transportation information servers. The server can output potential route plans to the client device. The server can then output instructions to one or more AVs to carry out a route plan in the potential route plans responsive to receiving an indication that a user of the client device has selected the route plan.

FIGS. 5-10 illustrate exemplary methodologies relating to multiple-modality transport. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 5:
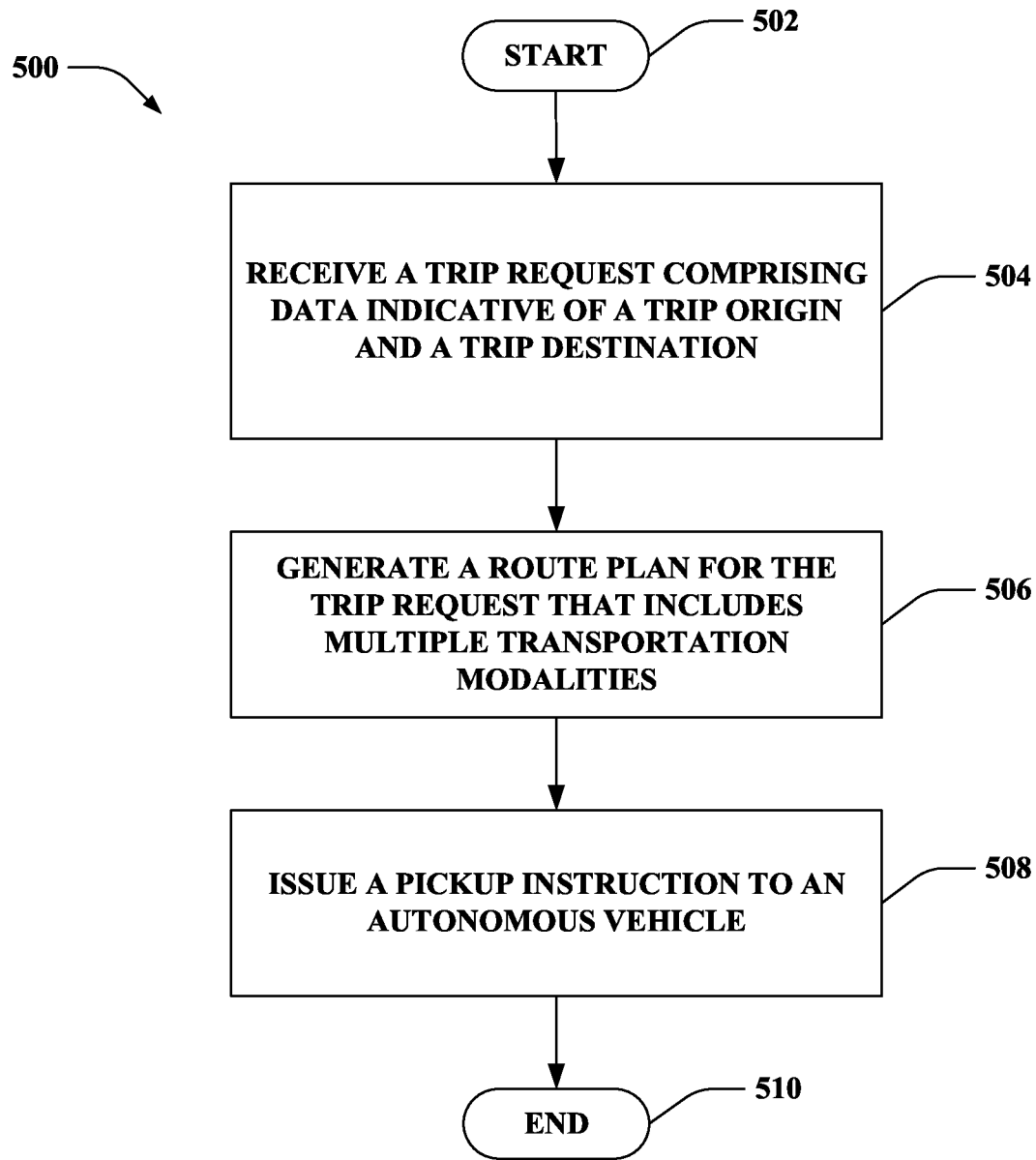
FIG. 5 is a flow diagram that illustrates an exemplary methodology performed by a server computing device in connection with a multiple-modality transportation system.

With reference to FIG. 5, an exemplary methodology 500 performed by a server computing device in a multiple-modality transportation system is illustrated. The methodology 500 begins at 502, and at 504, a trip request that comprises data indicative of a trip origin and a trip destination is received. In an example, the trip request can be received from a client computing device that is operated by a user in connection with ordering transportation from the trip origin to the trip destination. At 506 a route plan that includes multiple transportation modalities is generated for the trip request. The route plan is generated by performing an optimization over routing information that includes a map of a region that includes the trip origin and the trip destination indicated in the trip request. The multiple transportation modalities include transport by way of an AV and a second transportation modality. A pickup instruction is issued to an AV at 508, the pickup instruction configured to cause the AV to navigate to a pickup location included in the route plan generated at 506. The methodology 500 completes at 510.

Figure 6:
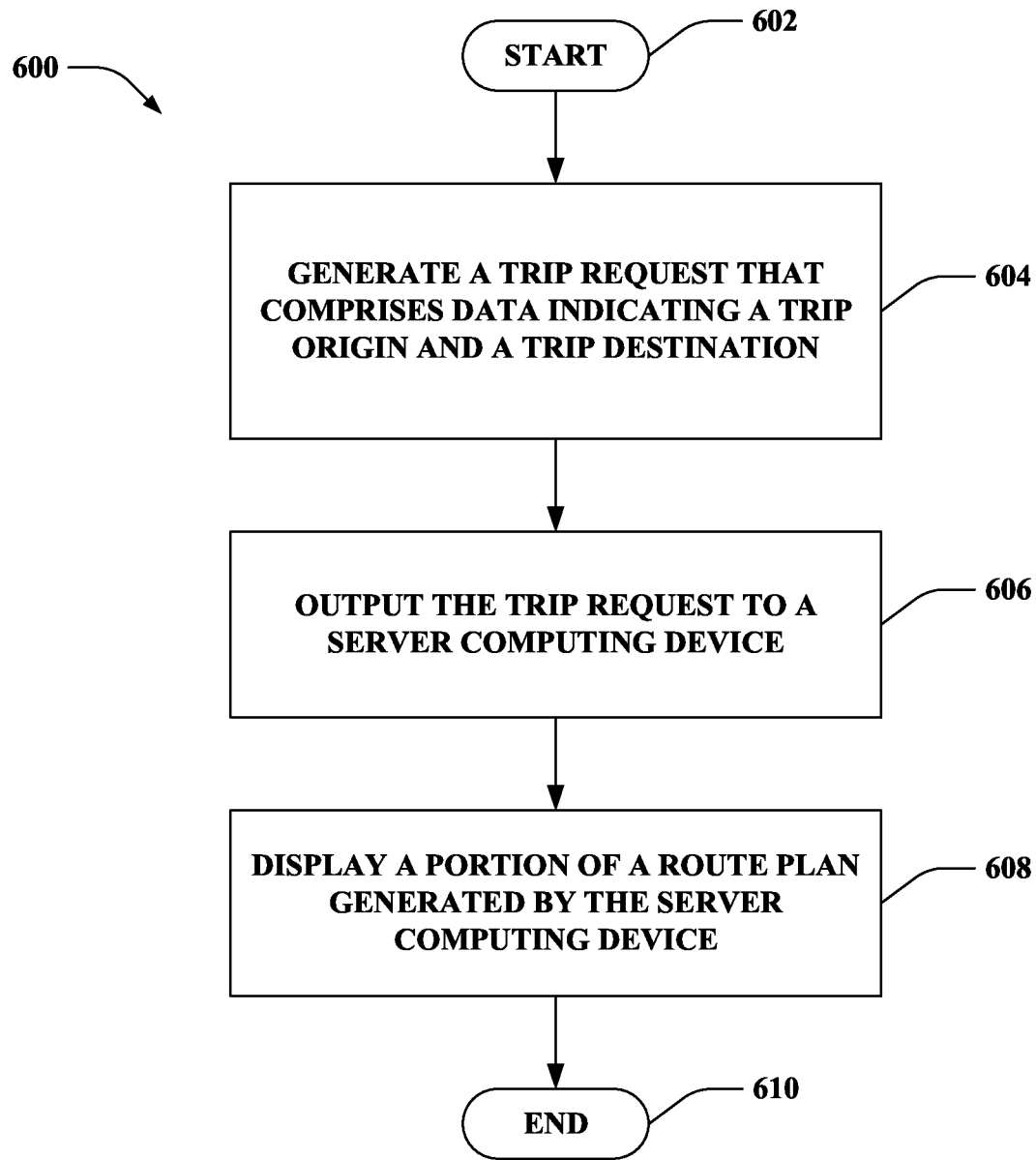
FIG. 6 is a flow diagram that illustrates an exemplary methodology performed by a client computing device in connection with a multiple-modality transportation system.

With reference now to FIG. 6, an exemplary methodology 600 performed by a client computing device in a multiple-modality transportation system is illustrated. The methodology 600 begins at 602, and at 604 a trip request that comprises data indicating a trip origin and a trip destination is generated. The trip request can be generated responsive to receiving user input that is indicative of the desired trip destination of a user of the client computing device. The trip request is output to a server computing device at 606. The trip request is configured to cause the server computing device to generate a route plan for the trip request that includes multiple transportation modalities. As described in greater detail above, the server computing device can generate the route plan by performing an optimization over routing information that includes a map of the trip origin and the trip destination indicated in the trip request. At 608, responsive to receiving data indicative of a route plan generated by the server computing device for the trip request, a graphical indication of at least a portion of the route plan is displayed on a display of the client computing device, whereupon the methodology 600 ends 610.

Figure 7:
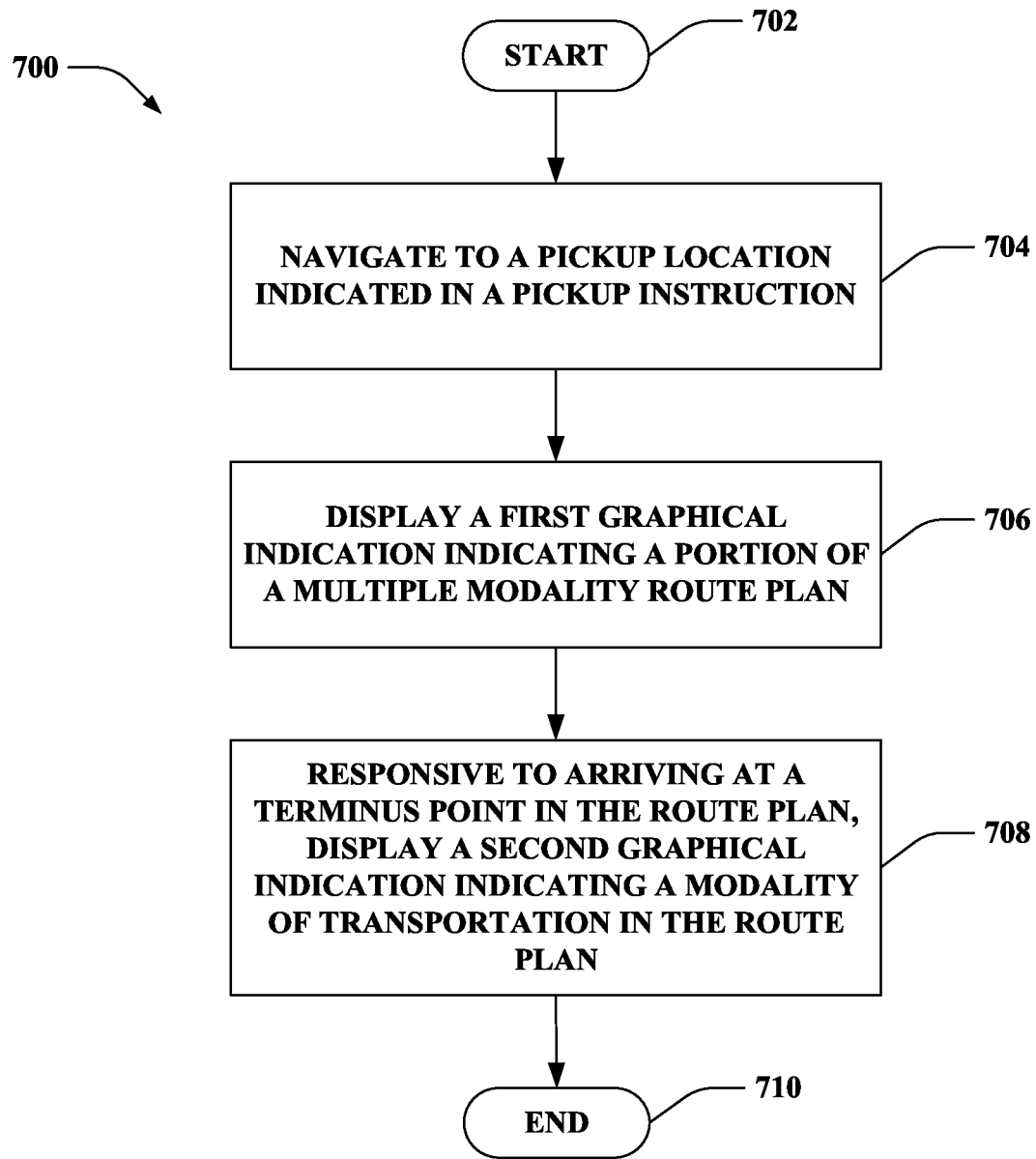
FIG. 7 is a flow diagram that illustrates an exemplary methodology performed by an AV in connection with a multiple-modality transportation system.

With reference now to FIG. 7, an exemplary methodology 700 performed by an AV in a multiple-modality transportation system is illustrated. The methodology 700 begins at 702 and at 704 the AV navigates to a pickup location indicated in a pickup instruction, the pickup instruction being transmitted to the AV by a server computing device in connection with a route plan that includes multiple transportation modalities. In an exemplary embodiment, the route plan can be a route plan generated by the server in response to a trip request from a client computing device. At 706, a first graphical indication that indicates at least a portion of the multiple modality route plan is displayed on a display included in the AV. A second graphical indication is displayed at 708 responsive to arriving at a terminus point in the route plan, the terminus point being a point at which the route plan indicates that a passenger of the AV is to change from using a first modality of transportation to a second modality of transportation. The second graphical indication indicates the second modality of transportation, thereby providing the user guidance in transferring from the first modality of transportation (e.g., the AV) to the second modality of transportation. The methodology 700 ends at 710.

Figure 8:
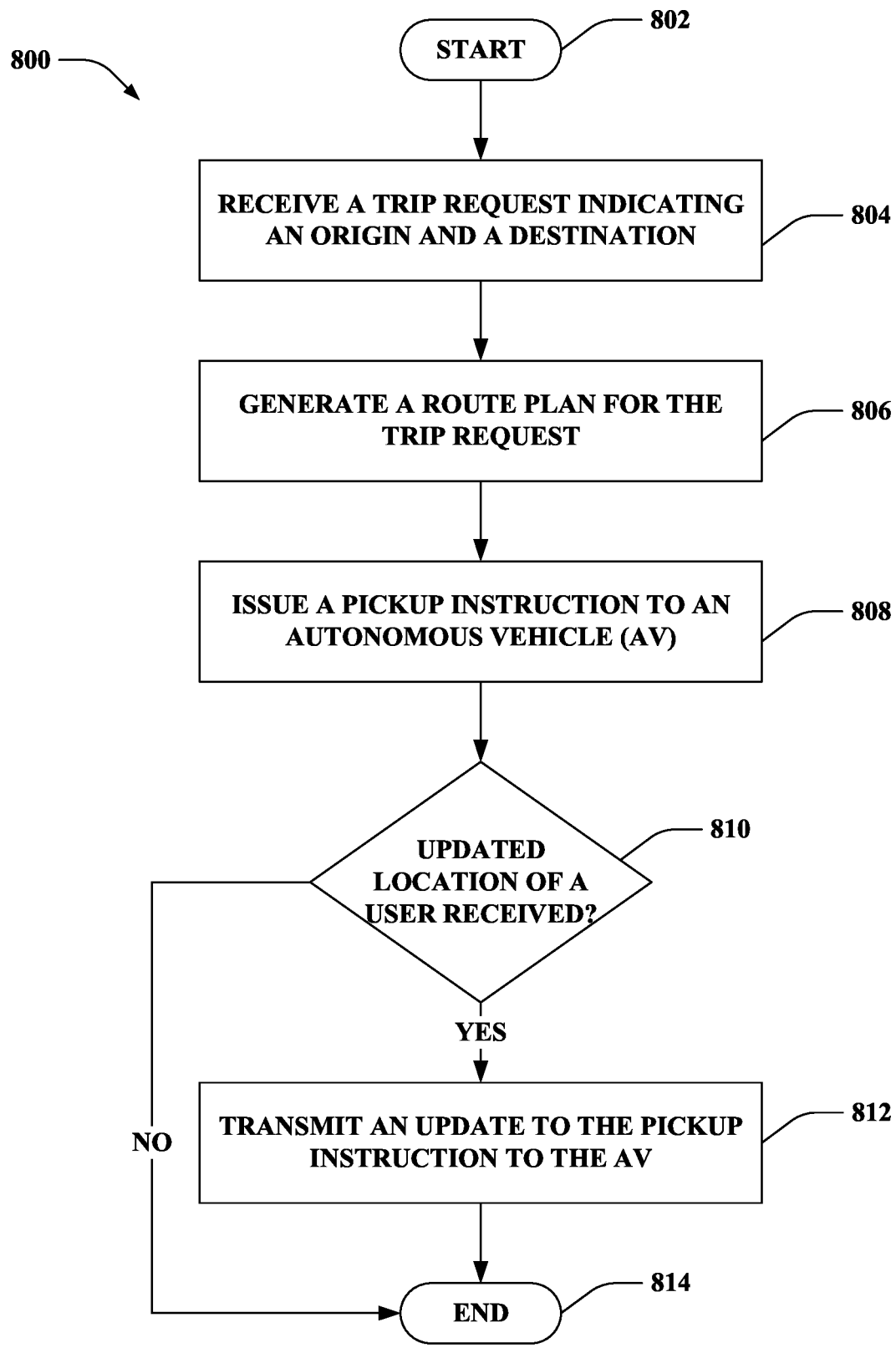
FIG. 8 is a flow diagram that illustrates an exemplary methodology performed by a server computing device in connection with dynamically updating a route plan in a transportation system.

With reference now to FIG. 8, a methodology 800 performed by a server computing device of a transportation system in connection with dynamically updating a route plan. The methodology 800 begins at 802 and at 804 a trip request that indicates a trip origin and a trip destination is received. By way of example, the trip request is received from a client computing device that is configured to communicate with the server computing device. At 806 a route plan is generated for the trip request based upon the trip origin, the trip destination, and routing information for a region that includes the trip origin and the trip destination. A pickup instruction is issued to an AV at 808, the pickup instruction configured to cause the AV to navigate to a first pickup location included in the route plan. In an example, the first pickup location can be a location at which the AV is intended to meet a passenger at a particular time. At 810 a determination is made whether an updated location of a user (e.g., a user of a client computing device from which the trip request is received at 804) has been received. If an updated location of the user has been received, an update to the pickup instruction is transmitted to the AV at 812 and the methodology 800 ends 814. The update to the pickup instruction is configured to cause the AV to navigate to a second pickup location. For example, the second pickup location can be a pickup location that is closer to the updated location of the user in order to avoid having the AV or the user wait for the other. If it is determined that an updated location of the user has not been received at 810, the methodology 800 completes at 814.

Figure 9:
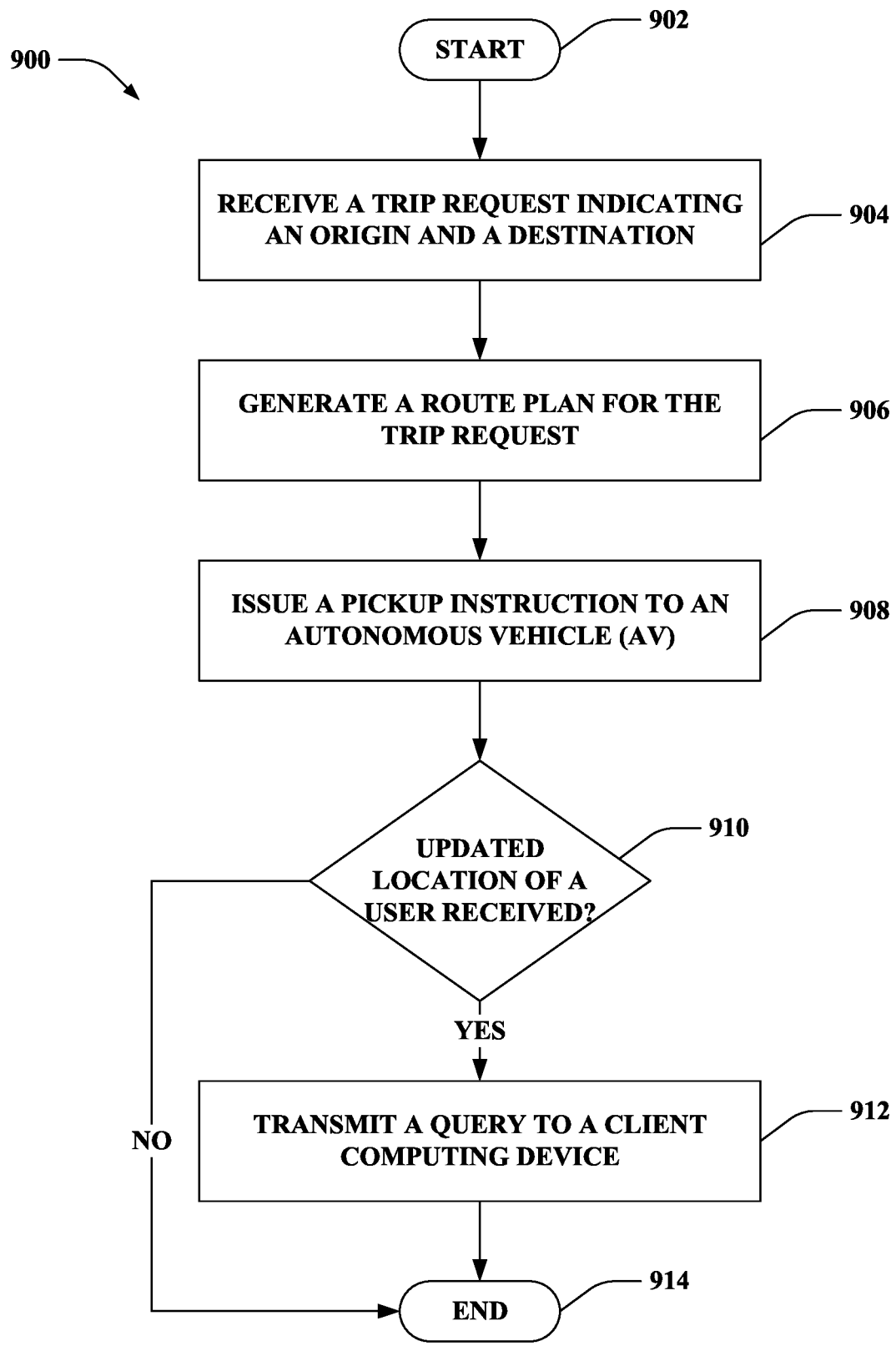
FIG. 9 is a flow diagram that illustrates another exemplary methodology performed by a server computing device in connection with dynamically updating a route plan in a transportation system.

With reference now to FIG. 9, another methodology 900 performed by a server computing device of a transportation system in connection with dynamically updating a route plan is illustrated. The methodology 900 begins at 902 and at 904 a trip request that indicates a trip origin and a trip destination is received. At 906 a route plan is generated for the trip request based upon the trip origin, the trip destination, and routing information relating to a region that includes the trip origin and the trip destination. A pickup instruction is issued to an AV at 908, the pickup instruction configured to cause the AV to navigate to a pickup location included in the route plan. At 910, a determination is made whether an updated location of a user of a client computing device (e.g., a client computing device from which the trip request is received at 904) has been received. If an updated location of the user has been received, a query is transmitted to the client computing device at 912, whereupon the methodology 900 completes 914. The query is configured to cause the client computing device to prompt the user for input that indicates whether the route plan is desirably updated by the user. Subsequently, the user can provide input to the client computing device indicating that the route is desirably updated or, for example, that the user wishes to cancel transportation. If the route is desirably updated, the server computing device can transmit an update to the pickup instruction as described above with respect to the methodology 800. If it is determined at 910 that an updated location of the user has not been received, the methodology 900 ends at 914.

Figure 10:
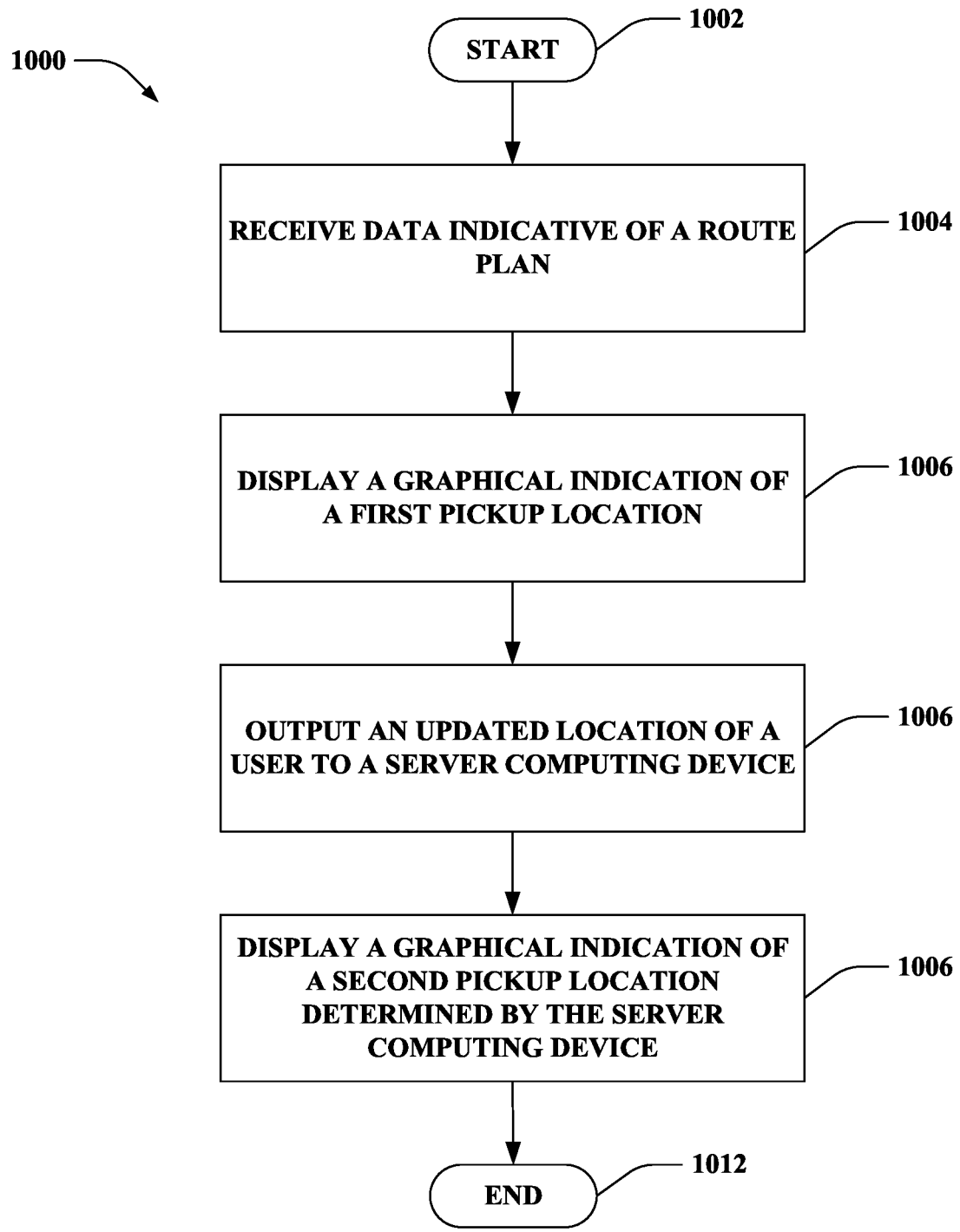
FIG. 10 is a flow diagram that illustrates an exemplary methodology performed by a client computing device in connection with dynamically updating a route plan in a transportation system.

With reference now to FIG. 10, a methodology 1000 performed by a client computing device of a transportation system in connection with dynamically updating a route plan is illustrated. The methodology 1000 begins at 1002 and at 1004 the client computing device receives data indicative of a route plan generated by a server computing device. The route plan can indicate, for example, a path to be traveled from an origin to a destination, modalities of transport to be taken by a user for various portions of the path, etc. At 1006 a graphical indication of a first pickup location is displayed on a display of the client computing device, the first pickup location being included in the route plan. At 1008, an updated location of a user of the client computing device is output to the server computing device. A graphical indication of a second pickup location that is determined by the server computing device based on the updated location of the user is displayed by the client computing device at 1010. By way of example, the graphical indication of the second pickup location can be displayed in response to receiving an update from the server computing device that indicates the second pickup location as an update to the route plan. The methodology 1000 completes at 1012.

Figure 11:
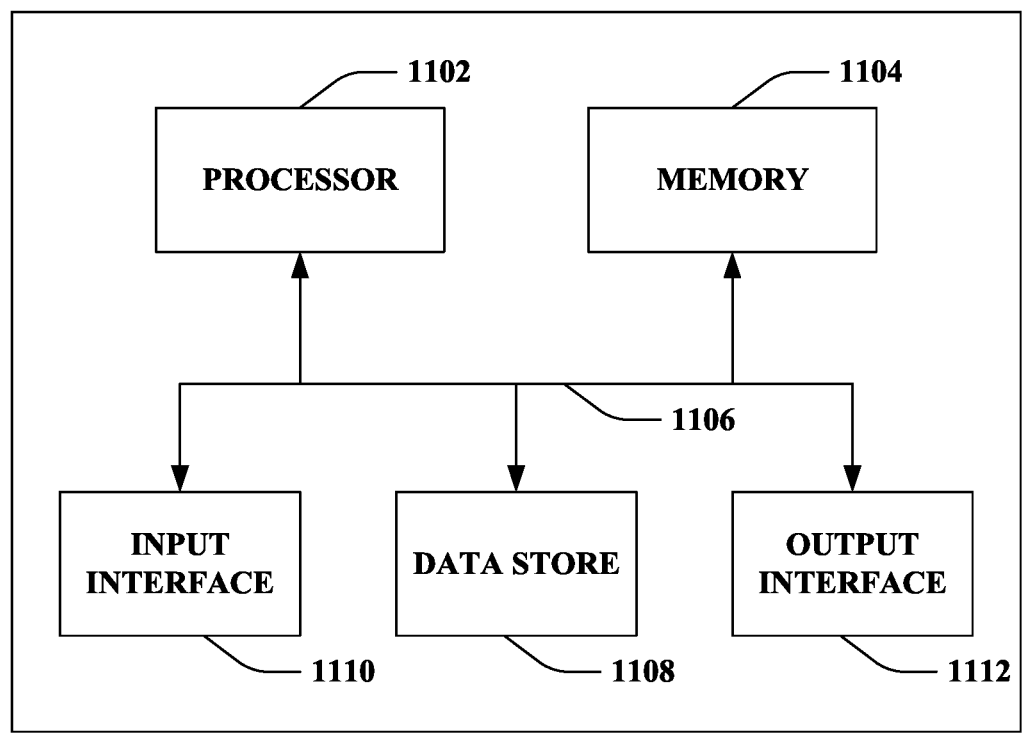
FIG. 11 illustrates an exemplary computing device.

Referring now to FIG. 11, a high-level illustration of an exemplary computing device 1100 that can be used in accordance with the systems and methodologies disclosed herein is illustrated. For instance, the computing device 1100 may be or include any of the computing systems 102, 104, 110, 212. The computing device 1100 includes at least one processor 1102 that executes instructions that are stored in a memory 1104. The instructions may be, for instance, instructions for implementing functionality described as being carried out by one or more systems discussed above or instructions for implementing one or more of the methods described above. The processor 1102 may be a GPU, a plurality of GPUs, a CPU, a plurality of CPUs, a multi-core processor, etc. The processor 1102 may access the memory 1104 by way of a system bus 1106. In addition to storing executable instructions, the memory 1104 may also store data pertaining to transportation modalities available in a region, user account information, and so forth.

The computing device 1100 additionally includes a data store 1108 that is accessible by the processor 1102 by way of the system bus 1106. The data store 1108 may include executable instructions, routing information pertaining to a region, data relating to transportation modalities in a region, user account information, etc. The computing device 1100 also includes an input interface 1110 that allows external devices to communicate with the computing device 1100.

For instance, the input interface 1110 may be used to receive instructions from an external computer device, from a user, etc. The computing device 1100 also includes an output interface 1112 that interfaces the computing device 1100 with one or more external devices. For example, the computing device 1100 may transmit control signals to the vehicle propulsion system 106, the braking system 108, and/or the steering system 110 by way of the output interface 1112. In another example, the output interface 1112 can be or include a display.

Additionally, while illustrated as a single system, it is to be understood that the computing device 1100 may be a distributed system. Thus, for instance, several devices may be in communication by way of a network connection and may collectively perform tasks described as being performed by the computing device 1100.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computer-executable method, comprising:
   receiving a trip request from a client computing device, the trip request comprising data indicative of a trip origin and a trip destination;
   generating a route plan for the trip request based upon the trip origin, the trip destination, and routing information pertaining to a region that includes the trip origin and the trip destination, the route plan including multiple transportation modalities, the multiple transportation modalities including a public transportation modality and transport by way of an autonomous vehicle (AV);
   issuing a pickup instruction to the AV, wherein the pickup instruction is configured to cause the AV to begin navigating to a pickup location included in the route plan, the pickup location being a terminus point of the public transportation modality;
   responsive to receiving an update of a location of a user of the client computing device, determining that the user will fail to satisfy the route plan; and
   responsive to determining that the user will fail to satisfy the route plan, transmitting a query to the client computing device, the query configured to cause the client computing device to prompt the user for input indicating whether the route plan is desirably updated for the user.

2. The method of claim 1, further comprising:
   responsive to receipt of an indication that the route plan is desirably updated for the user, outputting a second pickup instruction to the AV or a second AV, the second pickup instruction configured to cause the AV or the second AV to navigate to a second pickup location not included in the route plan.

3. The method of claim 1, further comprising:
   responsive to receipt of an indication that the route plan is desirably cancelled, cancelling the trip to the trip destination for the user.

4. The method of claim 1, wherein the multiple transportation modalities include at least one of a train, a bus, or a personal transportation device.

5. The method of claim 1, wherein determining that the user will fail to satisfy the route plan comprises determining that the user has deviated from the route plan.

6. The method of claim 5, wherein determining that the user has deviated from the route plan is based upon the update of the location of the user.

7. The method of claim 5, wherein determining that the user has deviated from the route plan comprises determining that the user has exited the public transportation modality prior to the public transportation modality reaching the terminus point.

8. The method of claim 5, wherein determining that the user has deviated from the route plan comprises determining that the updated location of the user is greater than a threshold distance from any location along the route plan.

9. The method of claim 1, wherein the pickup instruction is configured to cause the AV to begin navigating to the pickup location such that the AV is expected to arrive at the pickup location prior to an expected arrival time of the user of the client computing device at the terminus point of the public transportation modality.

10. A computing system, comprising:
a processor; and
memory that stores computer-executable instructions that, when executed by the processor, cause the processor to perform acts comprising:
- receiving a trip request from a client computing device in communication with the computing system, the trip request comprising data indicative of a trip origin and a trip destination;
- generating a route plan for the trip request based upon the trip origin, the trip destination, and routing information pertaining to a region that includes the trip origin and the trip destination, the route plan including multiple transportation modalities, the multiple transportation modalities including a public transportation modality and transport by way of an autonomous vehicle (AV);
- issuing a pickup instruction to the AV, wherein the pickup instruction is configured to cause the AV to begin navigating to a pickup location included in the route plan, the pickup location being a terminus point of the public transportation modality;
- responsive to receiving an update of a location of a user of the client computing device, determining that the user will fail to satisfy the route plan; and
- responsive to determining that the user will fail to satisfy the route plan, transmitting a query to the client computing device, the query configured to cause the client computing device to prompt the user for input indicating whether the route plan is desirably updated for the user.

11. The computing system of claim 10, wherein generating the route plan is based upon a user modality setting specifying a first set of transportation modalities that the user is willing to take in a first operational region that includes the trip origin and the trip destination and a second set of transportation modalities that the user is willing to take in a second operational region, wherein the first set of transportation modalities fails to include at least one transportation modality included in the second set of transportation modalities, and wherein further the route plan includes only transportation modalities specified in the first set of transportation modalities.

12. The computing system of claim 10, the acts further comprising:
- responsive to receipt of an indication that the route plan is desirably updated for the user, outputting a second pickup instruction to the AV or a second AV, the second pickup instruction configured to cause the AV or the second AV to navigate to a second pickup location not included in the route plan.

13. The computing system of claim 10, wherein determining that the user will fail to satisfy the route plan comprises determining that the user has deviated from the route plan.

14. The computing system of claim 13, wherein determining that the user has deviated from the route plan is based upon the update of the location of the user.

15. The computing system of claim 13, wherein determining that the user has deviated from the route plan comprises determining that the user has exited the public transportation modality prior to the public transportation modality reaching the terminus point.

16. The computing system of claim 13, wherein determining that the user has deviated from the route plan comprises determining that the updated location of the user is greater than a threshold distance from any location along the route plan.

\* \* \* \* \*